Aug. 3, 1954     H. RICH ET AL     2,685,674
SYNCHROSCOPE
Filed March 8, 1952
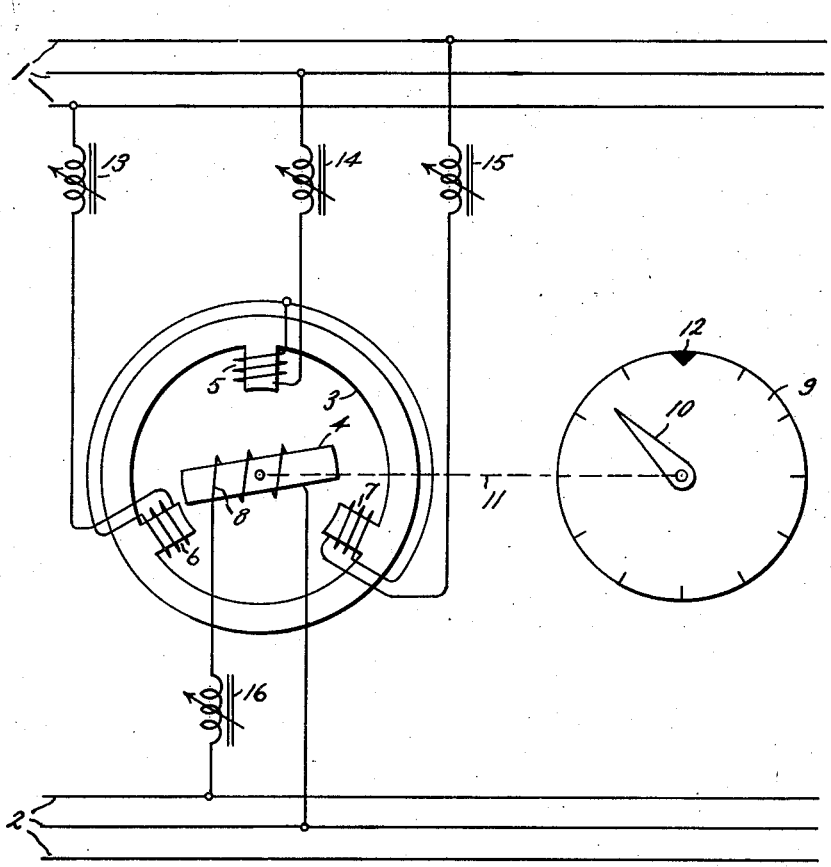
Inventors:
Harold Rich,
George J. Flynn,
by Richard E. Hosley
Their Attorney.

UNITED STATES PATENT OFFICE 2,685,674

SYNCHROSCOPE

Harold Rich, Lynn, and George J. Flynn, Winchester, Mass., assignors to General Electric Company, a corporation of New York Application March 8, 1952, Serial No. 275,651

1 Claim. (Cl. 324—86)

Our invention relates to improvements in synchroscopes for indicating synchronism of polyphase electrical circuits, and has for its principal object the provision of an improved synchroscope useful with polyphase circuits wherein the voltage and frequency may vary over wide ranges.

Two alternating current electrical power circuits can generally be interconnected safely only when the two circuits are in substantial synchronism with respect to frequency and phase. For indicating synchronism of the two circuits, synchroscopes are commonly employed, which may comprise a stator having windings connected to one of the alternating current circuits, and a rotor having a winding connected to the other circuit. The rotor rotates at a speed proportional to the difference in frequency between the two circuits; and when both circuits are adjusted to substantially the same frequency, the angular position of the rotor indicates the phase relation between the two circuits. The two circuits are interconnected when the synchroscope rotor has stopped, or is moving quite slowly, indicating substantial frequency synchronization, and has come to an angular position which indicates substantial phase synchronism. Angular position indicating means, such as a dial and pointer mechanically connected to the rotor, is commonly employed for easy observation of the rotor position.

In synchroscopes heretofore used, the rotor and stator circuits have quite different electrical impedance characteristics. One may even be capacitive, while the other may be inductive, so that the electric currents in the respective windings are unequally shifted in phase with respect to the power circuits to which they are connected. This does not present a serious difficulty when the synchroscope is always to be used substantially at a single frequency, since the unequal phase shifts may be taken into account in calibrating the instrument. However, it does present a very serious problem when the synchroscope must be used over a wide range of frequencies. For example, at relatively high frequencies the inequality between the respective phase shifts in the stator and rotor circuits may be much greater than at the lower frequencies. If the synchroscope is calibrated at a high frequency, it will indicate phase synchronism incorrectly at lower frequencies, and vice versa.

Briefly stated, in accordance with one aspect of our invention, a reactor is connected in series with each winding of the synchroscope, and the impedance values of these reactors are so adjusted that each series-connected winding and reactor combination has substantially the same ratio of inductance to resistance as the other series-connected winding and reactor combinations. Therefore, the respective currents in each winding are shifted in phase by substantially equal amounts over a very wide range of frequencies, and the synchroscope remains accurately calibrated over the entire frequency range.

Since the series reactors make the synchroscope circuit impedance vary with frequency, our improved arrangement is especially useful with electrical power circuits in which voltage and frequency may both vary over a wide range, but maintain a relatively constant ratio; that is, voltage increases with increasing frequency.

Our invention will be better understood from the following description taken in connection with the accompanying drawing, and its scope will be pointed out in the appended claims.

In the drawing, the single figure is a schematic circuit diagram of a synchroscope embodying our invention.

Referring now to the drawing, 1 and 2 represent two 3-phase electrical power circuits which must be adjusted to substantial synchronism before being interconnected. For indicating synchronism of the two circuits, a synchroscope is provided which comprises a 3-phase stator 3 and a single-phase rotor 4. Stator 3 has three windings 5, 6 and 7 connected in a conventional Y arrangement. The three stator windings are connected to respective phases of electrical power circuit 1, as shown. Rotor 4 has a winding 8 connected to one phase of electrical power circuit 2. As is well known, rotor 4 rotates at a speed which is proportional to any difference in frequency between the two power circuits. When the two power circuits are adjusted to the same frequency, rotor 4 comes to rest at an angular position which depends upon the phase relation between the two circuits. For conveniently indicating the angular position of rotor 4, there is provided a calibrated dial 9 and a pointer 10 which is mechanically connected to rotor 4, as indicated by broken line 11. The pointer and the angular position between the stator and the rotor may be adjusted so that pointer 10 points to the mark 12 on dial 9 when the two power circuits are in phase synchronism. Thus, when pointer 10 comes substantially to rest at mark 12, the two power circuits are in substantial synchronism with respect to frequency and phase, and may be interconnected.

To maintain the calibration of the synchroscope over a wide range of frequencies, so that mark 12 will always correctly indicate phase synchronism, four inductive reactors 13, 14, 15 and 16 are connected in series with windings 5, 6, 7 and 8 respectively, as shown. The impedance values of the four reactors are adjusted, or initially selected, so that the ratio of inductance to resistance is substantially the same for each series-connected winding and reactor combination; that is, the ratio of inductance to resistance of reactor 13 and winding 6 in series is the same as the ratio of inductance to resistance of reactor 14 and winding 5 in series, and the ratio of inductance to resistance of reactor 15 and winding 7 in series, and also the ratio of inductance to resistance of reactor 16 and winding 8 in series. Since the synchroscope circuits are all inductive, the current through each winding of the synchroscope lags the voltage of the power circuit phase to which it is connected. But, since the ratio of inductance to resistance is the same for all of the synchroscope circuits, the phase lags are equal in all of the windings and therefore cause no error in the phase indication of the synchroscope. As a result, the synchroscope indicates phase synchronism correctly, without recalibration, over a very wide frequency range.

What we claim as new and desire to secure by Letters Patent of the United States is:

A synchroscope for indicating synchronism of two three-phase electrical circuits, comprising a three-phase stator having three windings connected to respective phases of one such circuit, a single-phase rotor having a winding connected to one phase of the other such circuit, an angular position-indicating dial and pointer mechanically connected to said rotor, and four inductive reactors respectively connected in series with each of said windings, said reactors having impedance values such that the ratio of inductance to resistance is substantially the same for each series-connected winding and reactor combination.

References Cited in the file of this patent

UNITED STATES PATENTS

| Number | Name | Date |
| --- | --- | --- |
| 1,794,509 | Beckmann | Mar. 3, 1931 |
| 2,240,680 | Stuart | May 6, 1941 |
| 2,288,230 | Hornbruch | June 30, 1942 |
| 2,362,842 | Mueller | Nov. 14, 1944 |

OTHER REFERENCES

Publication I—General Electric Review, vol. 33, No. 9, Sept. 1930, pp. 500–504.